United States Patent
Svendsen et al.

(10) Patent No.: US 7,993,433 B2
(45) Date of Patent: Aug. 9, 2011

(54) METHOD AND APPARATUS FOR ENERGY REDUCTION IN ACID GAS CAPTURE

(75) Inventors: Hallvard F. Svendsen, Trondheim (NO); Finn Andrew Tobiesen, Trondheim (NO); Thor Mejdell, Trondheim (NO); Karl Anders Hoff, Trondheim (NO); Olav Juliussen, Trondheim (NO)

(73) Assignee: NTNU Technology Transfer AS, Trondheim (NO)

( * ) Notice: Subject to any disclaimer, the term of this patent is extended or adjusted under 35 U.S.C. 154(b) by 215 days.

(21) Appl. No.: 11/922,718

(22) PCT Filed: Jun. 28, 2006

(86) PCT No.: PCT/NO2006/000249
§ 371 (c)(1),
(2), (4) Date: Jun. 22, 2009

(87) PCT Pub. No.: WO2007/001190
PCT Pub. Date: Jan. 4, 2007

(65) Prior Publication Data
US 2009/0293722 A1    Dec. 3, 2009

(30) Foreign Application Priority Data
Jun. 28, 2005  (NO) .................................. 20053148

(51) Int. Cl.
*B01D 53/14*   (2006.01)

(52) U.S. Cl. ........................................ 95/235; 95/236
(58) Field of Classification Search .................... 95/135, 95/235, 236, 136
See application file for complete search history.

(56) References Cited

U.S. PATENT DOCUMENTS

| | | | |
|---|---|---|---|
| 6,312,655 B1 | 11/2001 | Hesse et al. | |
| 6,395,678 B1 * | 5/2002 | Summers et al. | 502/416 |
| 2004/0253159 A1 | 12/2004 | Hakka et al. | |

FOREIGN PATENT DOCUMENTS

| | | |
|---|---|---|
| EP | 1 016 445 | 7/2000 |
| GB | 484714 | 5/1938 |

OTHER PUBLICATIONS

Erga, O., et al. "Carbon Dioxide Recovery by Means of Aqueous Amines." *Energy Convers. Mgmt.* (1995) vol. 36, No. 6-9, pp. 387-392.

* cited by examiner

*Primary Examiner* — Duane Smith
*Assistant Examiner* — Tiffany N Palmer
(74) *Attorney, Agent, or Firm* — Ladas & Parry LLP (57) ABSTRACT

The invention relates to a new method for removing and recovering of acid gases from a gaseous mixture in an absorption plant by adding an organic acid to a stream of the rich absorbent in the desorber in order to release acid gas by shifting the acid gas equilibrium towards the gas side, and the organic acid is subsequently separated from the absorbent. With this method, the energy consumption of the process is substantially reduced. The invention also relates to an apparatus for performing this method.

11 Claims, 7 Drawing Sheets

METHOD AND APPARATUS FOR ENERGY REDUCTION IN ACID GAS CAPTURE

AREA OF INVENTION

Large emissions of greenhouse gases, and in particular $CO_2$, are today recognized as one of the major causes of global warming. Absorption is the most frequently used technology for $CO_2$ removal, but large scale removal from gases with low $CO_2$ partial pressures is limited by economic considerations. The absorption of $CO_2$ and $H_2S$ from natural gas, process gases and in particular exhaust gases from as for example fossil fuel based power stations, iron and steel plants, is associated with high requirements of energy for the regeneration of the absorbent.

The present invention addresses this particular problem as it introduces a new method and apparatus for reducing the energy requirements for absorbent regeneration by adding a component that simplifies the regeneration, but has limited effect on the operation of the absorber.

Known Technology

Figure 1:
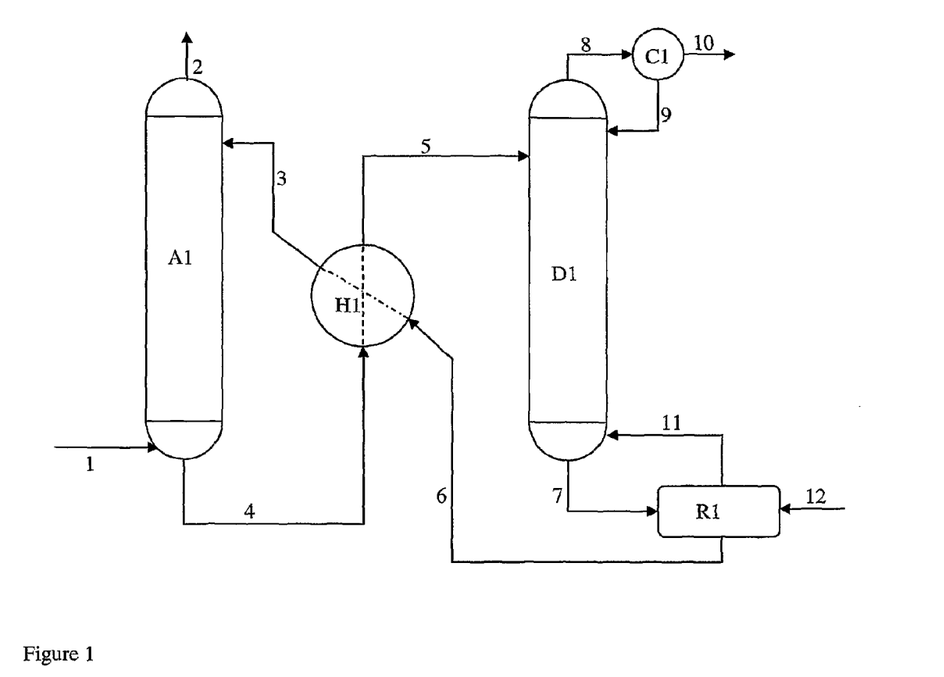
FIG. 1 shows a conventional absorption plant for $CO_2$ removal.

The conventional layout for an absorption plant for acid gas (e.g $CO_2$ or $H_2S$) removal from e.g. exhaust gases is given on in FIG. 1 in simplified form. The gas to be treated 1 enters the absorber bottom and passes upwards through the absorber A1. The lean absorbent 3 enters the absorber A1 at a position above the column internals and passes downwards countercurrent to the gas. Intimate contact between the phases and the properties of the absorbent make the acid gas leave the gas phase and become absorbed in the absorbent, usually in part caused by an exothermic chemical reaction in the liquid phase. To limit losses of absorbent, the absorber can be equipped with a water-wash section at the top, but this is irrelevant to the invention.

The cleaned gas 2 leaves the absorber A1 at the top, and the liquid, which is now rich in acid gas 4, leaves the absorber A1 at the bottom. The rich absorbent solution 4 is then passed through a heat exchanger H1 where it is heated to a temperature close to that of the desorber, and then passed as stream 5 to the desorber D1.

In the desorber the equilibria governing the solution of the acid gas, including the chemical reactions, are reversed by an increase in the temperature. The increased temperature is achieved by introducing direct or indirect heating to the desorber reboiler R1, as shown in FIG. 1. After reversal of the equilibrium and desorption of the acid gases, the absorbent leaves the desorber as stream 7 and as lean absorbent 6 from the reboiler R1 which also generates steam 11 for the desorber. Lean absorbent 6 passes through the heat exchanger H1 simultaneously heating the rich absorbent, before it may be cooled and lead back to the absorber A1 as stream 3. $CO_2$ from the desorber, together with water vapour 8 passes to a condenser C1 where the temperature is reduced and water condensed and returned to the desorber 9. The gas phase containing mainly $CO_2$ 10 is the product.

The main obstacle to taking this technology into worldwide use for e.g. bulk $CO_2$-removal, is the energy required for absorbent regeneration In the desorber. For example, conventional technology, like the Fluor Econamine process will typically use about 3850 MJ of energy per ton $CO_2$ removed for absorption of $CO_2$ from exhaust from a coal fired power station (S. Reddy et al. Proceedings $2^{nd}$ national conference on Carbon Sequestration, pp 1-11, Alexandria USA, Mass. 2003). Improvements to these processes have been made and the Fluor Econamine Plus process is claimed to have a regeneration energy requirement of about 3250 MJ/ton $CO_2$ removed, (S. Reddy et al. Proceedings $2^{nd}$ national conference on Carbon Sequestration, pp 1-11, Alexandria USA, Mass. 2003). Also Mitsubishi has developed new processes and their new absorbent KS1 is claimed to require about 3250 MJ/ton $CO_2$ removed, (S. Reddy et al. Proceedings $2^{nd}$ national conference on Carbon Sequestration, pp 1-11, Alexandria USA, Mass. 2003 and Mimura et.al. Energy Convers. Mgmt. 36(1995), pp 397-400 and Chem. Eng. Comm., 170 (1998), pp 245-260).

However, these reductions in energy requirement are not enough to make absorption accepted as a viable technology for e.g. $CO_2$ removal from exhaust gases. No exact number for the necessary reduction in regeneration energy requirement can be given, but it is believed that the range 1500-1800 MJ/ton $CO_2$ removed could be acceptable.

It is known that organic acids can be formed as degradation products when amines are used as absorbents in the process. This is the case also for most systems with added degradation inhibitors since these are not totally immune to oxidation. When traces of oxygen are present, amines such as MEA will react with this to form e.g. glycine, glycolic acid and oxalic acid. (These compounds can further interact with themselves to form other degradation products) (ref: Leci and Goldthorpe.; Energy Convers. Mgmt, 33, 5-8, 477-485, 1992) These and other acids build up in the solution and circulate both through the absorber and desorber. These acids shift the equilibrium curves for both acid gas absorption and for desorption, but the total effect may be positive as a small reduction in energy requirements can be obtained. This way of operation has the disadvantage that the acids, which shift the equilibrium curves, are present in the whole process. They can thus not be present in large concentrations, and absorbent reclaiming will be necessary on a regular basis for removing these acids and other degradation products as heat stable salts.

It is known that acid salt solutions, e.g. sodium adipate, can be used in high concentration in the desorber section and the acid salt removed from the circuit by precipitation (ref: O. Erga, Ind. Eng. Chem. Fundam., 25 (1986), pp 692-695) in a process for removal of $SO_2$ from flue gases. In this process, the lean solution is heated and solvent evaporated. In this way, supersaturation of an adipic acid salt can be achieved and precipitation results in a lower concentration of the absorbent. This enhances the absorption.

DESCRIPTION OF INVENTION

The present invention provides a method for removing and recovering acid gases from a gaseous mixture in an absorption plant where the gaseous mixture passes through a basic absorbent in an absorber, and where the rich absorbent (i.e. absorbent with acid gas) passes through a heat exchanger, and then through a desorber where the acid gas is stripped off from the rich absorbent characterized in that organic acid(s) is (are) added to the rich absorbent stream in or before the desorber, in order to enhance the release of acid gas by shifting the acid gas equilibria toward the gas side, and where the organic acid(s) is (are) subsequently separated from the lean absorbent as a separate liquid phase, optionally by extraction into an organic solvent before its return to the absorber. With this method, the energy consumption of the process is substantially reduced. The organic acid may be a naphtenic acid, a $C_1$-$C_{18}$ carboxylic acid, an amino acid or a mixture thereof. The organic acid is such that a mixture thereof with lean absorbent (i.e. absorbent after stripping off the acid gas) will form two separate phases after release of the acid gas, one rich in organic acid and another rich in absorbent and water, and the two phases are separated in a liquid phase separator. The separation can be achieved by e.g. cooling of lean absorbent or by using an organic solvent for partial dissolution of the organic acid. The lean absorbent added to the absorber will thereby be low in organic acid.

Another aspect of the present invention is that the added organic acid(s) can bond to and remove heavy metals from the solution.

Further, the present invention provides an apparatus for performing the method, which includes supply of organic acid 5b, 13, 14a (FIG. 2) placed before the desorber D1 or before the cross flow heat exchanger H1, a separator S1 placed in the recycle line 3b-3a between the heat exchanger H1 and the absorber A1 to separate the organic acid 15 from the lean absorbent 3b. A desorber overhead separator S2 can be included in order to separate the three phases formed, and pipelines installed for recycling of the organic rich phase and a phase rich in water and absorbent. The separator can be of any type used for liquid/liquid separation, e.g. a gravity settler or a centrifugal separator.

Further, the present application provides apparatus with recycle pipelines 14a, 14b and 14c for the organic acid and a separator S3 for organic solvent placed after the cross flow heat exchanger with a return pipe 16 for solvent to the lean absorbent stream 6.

DETAILED DESCRIPTION OF INVENTION

The invention is related to how to change the equilibrium curves for desorption, in the desorber, without affecting to any large extent the equilibrium curves in the absorber.

Figure 2:
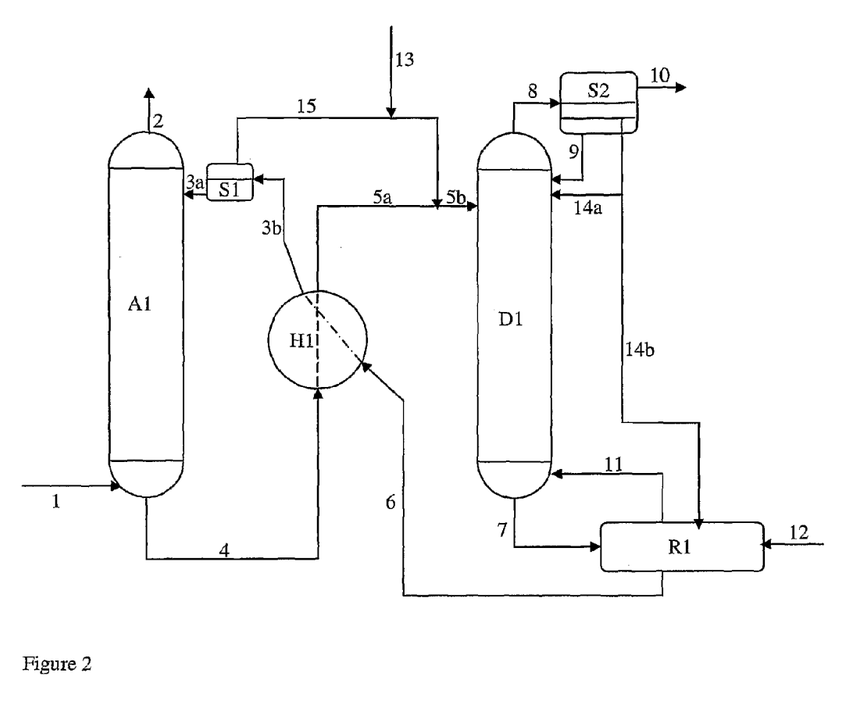
In FIG. 2 is shown an example of a typical flowsheet for a $CO_2$ removal plant operating according to the new invention.
Figure 3:
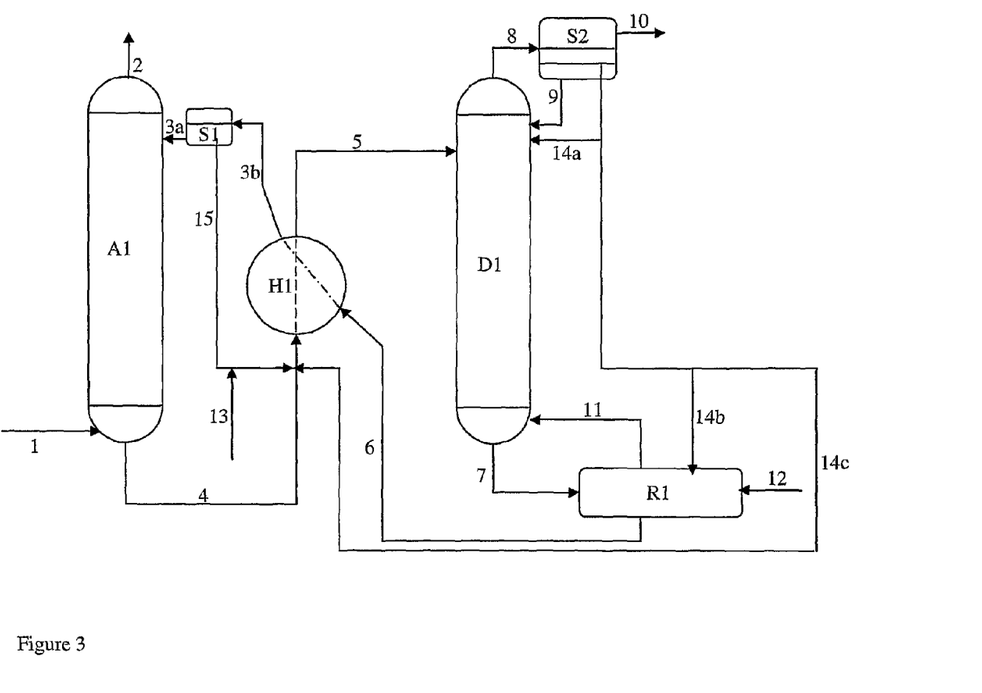
FIG. 3 shows an alternative to the configuration in FIG. 2 where the organic acid containing solution is returned to the rich and lean absorbent solution before the cross flow heat exchanger.
Figure 4:
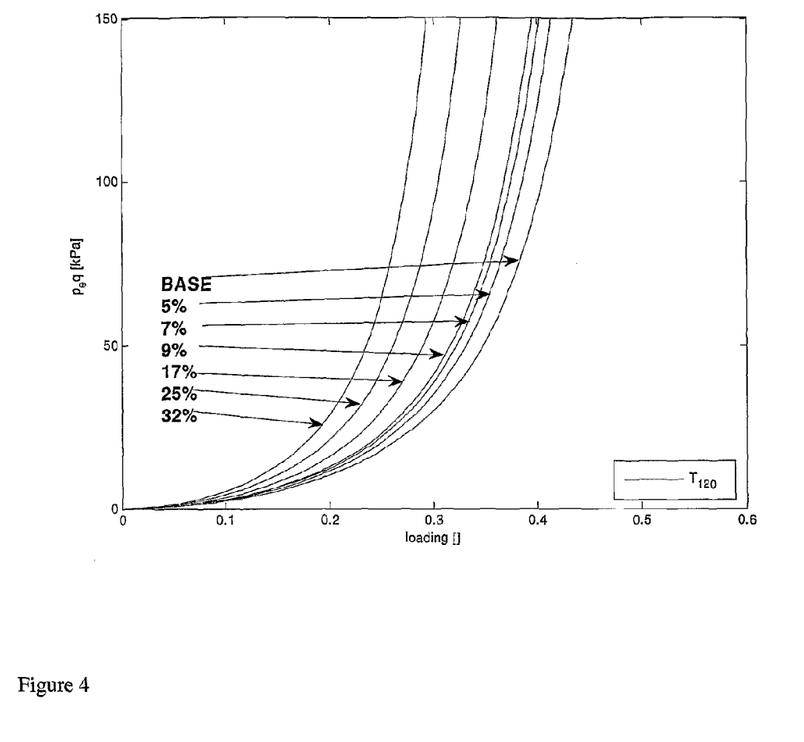
FIG. 4 shows the effect of partial neutralization on the partial pressure of $CO_2$ over an MEA solution at 120° C.

The basis for the invention is to add a partially or fully dissolvable constituent, preferably an organic acid, e.g. a naphtenic acid, a carboxylic acid or an amino acid to the rich absorbent stream at positions exemplified in FIGS. 2 and 3 by stream 13 as being just before the rich absorbent desorber inlet or the rich absorbent cross flow heat exchanger H1 inlet. These positions are just examples and non-limitative. The acid(s) can be added in pure form or as a mixture of an organic solvent and the organic acid(s). The acid(s) shall have the property of being increasingly dissolvable in the aqueous absorbent solution with increasing temperature. Thus a high solubility of the acid is found in the desorber. Adding acid to the absorbents, being a base, will neutralize the absorbent and shift the acid gas equilibrium toward the gas side. This will increase the partial pressure of the acid gas in the desorber D1 compared to the original process. The change of partial pressure will depend on the amount of organic acid dissolved in the aqueous absorbent and on the amount added. An example of the effect of partial neutralization on the equilibrium curves is given in FIG. 4. An increase in the partial pressure of $CO_2$ will ease the desorption and make it less energy demanding. An example is given in table 1 which is a result of a simulation. Here $CO_2$ absorption into the absorbent MEA (Mono-ethanolamine) is taken as an example. The absorbent is neutralized to different extents by an organic acid and this will shift acid gas loadings significantly. It can be seen that a 25% degree of neutralisation reduces the amount of energy required for $CO_2$ absorption from the normal figure of 3890 MJ/ton $CO_2$ to less than 2000 MJ/ton $CO_2$. A further increase in the degree of neutralization reduces the energy requirement further and at 32% neutralization, the energy requirement is well below 1500 MJ/ton $CO_2$.

TABLE 1

| Fraction of absorbent neutralized | Energy requirement (MJ/tCO2) | Absorbent lean loading mole $CO_2$/mole abs. | Absorbent rich loading mole $CO_2$/mole abs. |
|---|---|---|---|
| 0.0 | 3890 | 0.2000 | 0.457 |
| 0.05 | 3440 | 0.2100 | 0.457 |
| 0.07 | 3200 | 0.2160 | 0.457 |
| 0.09 | 2990 | 0.2310 | 0.457 |
| 0.17 | 2480 | 0.2400 | 0.457 |
| 0.25 | 1950 | 0.2666 | 0.457 |
| 0.32 | 1440 | 0.2960 | 0.457 |

The addition of organic acid(s) to the desorber will, if not removed before the return of the lean absorbent solution to the absorber, have a detrimental effect on the absorption capacity.

The second part of the invention therefore relates to the method for removing acid from the lean absorbent solution. This is achieved by selecting the properties of the organic acid added such that when the lean absorbent solution is cooled, as in the cross flow heat exchanger H1, the mixture forms two phases. One phase will be rich in absorbent and water and contain some remaining organic acid whereas the other phase will be rich in organic acid and contain some absorbent and water. As shown in FIG. 2, an acid rich phase 15 is separated in a conventional separator S1 and removed from the absorbent rich phase 3b. S1 is placed on the lean absorbent stream 3b-3a and can be a separator or a combined cooler and separator. The absorbent rich phase 3a then passes to the absorber A1. The organic acid rich phase 15 can be returned at a variety of locations, preferably into the hot rich absorbent stream 5a before it enters the desorber D1, as shown in FIG. 2, or to the rich absorbent stream 4 before it enters the cross flow heat exchanger H1, as shown in FIG. 3. The latter may have the added advantage that more heat can be transferred in the cross flow heat exchanger.

Part of the organic acid will, depending on its volatility, evaporate in the desorber and flow with $CO_2$, water, and absorbent 8 to the desorber overhead condenser S2 and be cooled and condense there. In the condenser S2 three phases will be formed. The gas phase 10 will contain mainly $CO_2$ and is the product. The liquid will form two phases where one will be rich in organic acid 14 and the other rich in water and absorbent 9. The organic acid rich phase will be returned, as a non-limiting example, to the desorber top 14a or to the reboiler 14b, as shown in FIG. 2, or as stream 14c to the rich absorbent stream 4 as shown in FIG. 3. A mix of both can also be used.

The process will work with organic basic components, e.g. all amines and mixtures thereof, for example the alkanol amines, e.g. MEA(monoethanolamine), DEA(diethanol amine), MDEA(methyl-diethanolamine), the di- and polyamines, e.g. AEEA (Aminoethyl-ethanolamine), DETA (diethylene-triamine), cyclic amines e.g. PZ(piperazine), and sterically hindered amines, e.g. AMP (Amino-methylpropanol), used as absorbents, but equally well with inorganic absorbents such as carbonates. It will also work in mixed systems based both on physical and chemical absorbents.

As organic acid non exclusive examples can be given the range of $C_1$- $C_{18}$ carboxylic acids such as pentanoic acid, hexanoic acid, heptanoic acid, octanoic acid, nonanoic acid, decanoic acid, undecanoic acid, dodecanoic acid, tridecanoic acid, valeric acid, and ethyl-hexanoic acid. Also included are the naphtenic acids in the same range. Also mixtures of carboxylic acids can be used, e.g. the commercially available blend Versatic 911. Examples of amino acids are: glycine, taurine, sarcosine, and proline.

Figure 5:
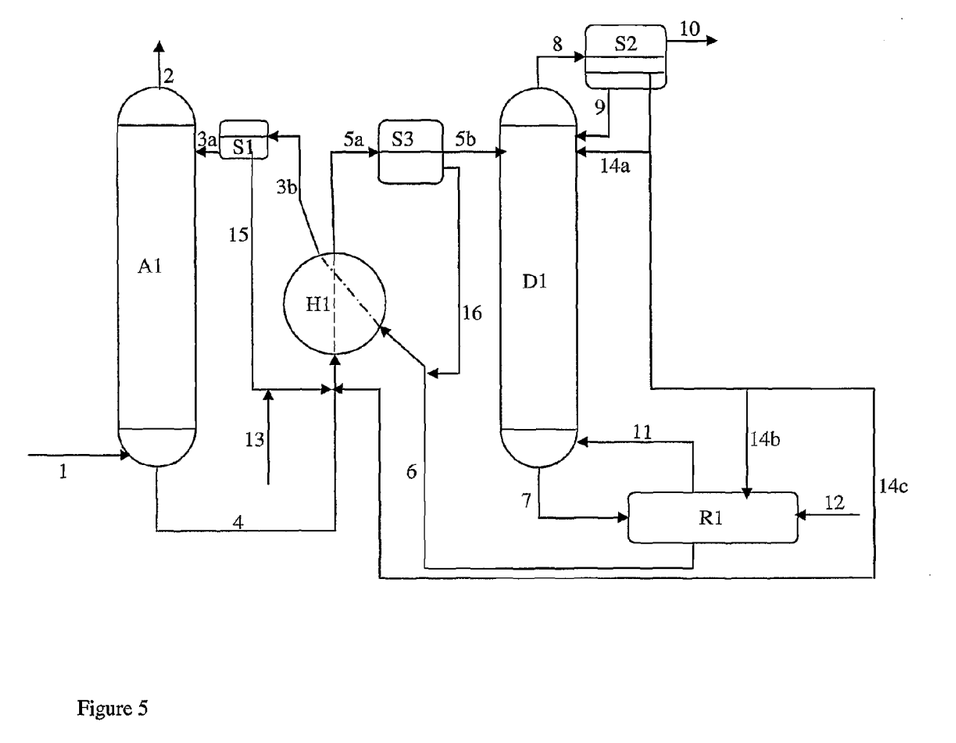
FIG. 5 is an alternative configuration where the organic acid is added together with an organic solvent and where the organic solvent is separated from the rich absorbent flow before entering the desorber and returned to the lean absorbent stream before the cross flow heat exchanger.

If the carboxylic acid is used in mixture with an organic solvent, as shown in FIG. 5, it may not be that the mixture is totally soluble in the absorbent solution at desorber D1 temperature. In this case an alternative way of operation will be to add a separator S3 on the to the rich absorbent stream 5a-5b and to separate off the organic solvent with its content of carboxylic acid. Thereby the existence of two liquid phases in the desorber is avoided. The organic solvent with some organic acid 16 will be returned to the lean absorbent flow 6 before the cross flow heat exchanger H1. Non-exclusive examples of solvents are: Shellsol 80, Exxol 80 and Solvesso.

Figure 6:
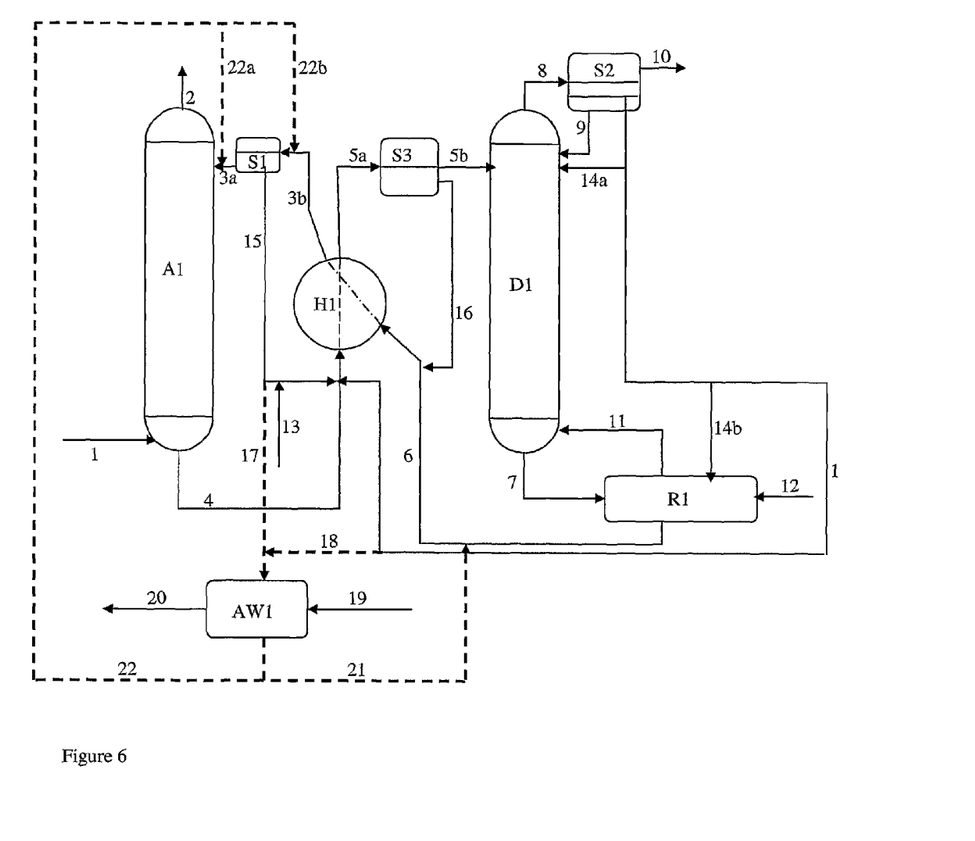
FIG. 6 shows the case of heavy metal removal, e.g. mercury, from the gas stream to be treated by extraction into the organic acid containing liquid phase and the subsequent removal of the metal in a separate wash of a bleed from the absorption process.

Another aspect of the current invention is that carboxylic acids and naphtenic acids have the capability of bonding and removing heavy metals from the solution and thereby from the gas. Heavy metals, and in particular mercury (Hg) is a very dangerous pollutant from coal fired power stations. The invented method has the added potential to remove this mercury. This aspect is shown in FIG. 6. Here bleed streams 17 and/or 18 of the phases rich in organic acid are taken out and washed with an inorganic acid/water solution 19. The mercury, and other heavy metals being extracted by the organic acid, will be transferred to the aqueous solution and handled separately 20. The cleaned bleed streams 21 and 22 are returned to the lean absorbent stream, either to stream 6 or 3a or 3b.

Figure 7:
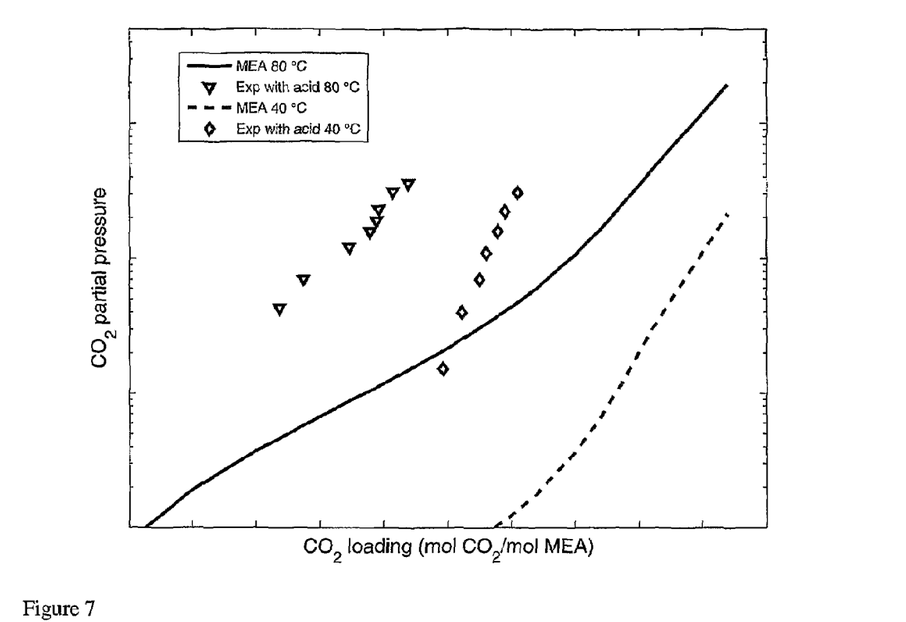
In FIG. 7 are shown $CO_2$ equilibrium data for MEA contacted with an organic acid in a solvent at two temperatures 40 and 80° C. illustrating the desired effects.

In FIG. 7 is shown one example of experimental data on the effect on the $CO_2$ equilibria of equilibrating an MEA/water mixture with a solvent/organic acid mixture at 40 and 80° C. respectively. The shift in the equilibrium curve is most pronounced for the highest temperature which is the desired effect.

The invention claimed is:

1. A method for removing and recovering an acid gas, from a gaseous mixture in an absorption plant, the method comprising the steps of:
    passing a gaseous mixture including the acid gas through an absorber and mixing the gaseous mixture with a basic absorbent to form a rich absorbent;
    passing the rich absorbent through a heat exchanger, and then through a desorber where the acid gas is released from the rich absorbent to form a lean absorbent, wherein a mixture of an organic acid dissolved in an organic solvent is added to the rich absorbent before passing the rich absorbent through the desorber to enhance the acid gas separation by shifting the acid gas equilibria towards the gas side, and wherein the organic acid is subsequently separated from the lean absorbent as a separate liquid phase by extracting the organic acid into the organic solvent before the lean absorbent is returned to the absorber.

2. A method according to claim 1, wherein the organic acid is a naphtenic acid or a $C_1$-$C_{18}$ carboxylic acid or a mixture thereof.

3. A method according to claim 1, wherein the organic acid is selected such that a mixture thereof with the lean absorbent will form two separate phases after release of the acid gas, one of the two separate phases being rich in organic acid and the other of the two separate phases being rich in the absorbent and water, and the two phases are separated.

4. A method according to claim 1, further comprising:
    extracting the organic solvent in which the organic acid is dissolved to from the rich absorbent before passing the rich absorbent through the desorber; and
    returning the organic solvent to a stream containing the lean absorbent.

5. A method according to claim 1, wherein part of the organic acid evaporated in the desorber is separated in a condenser where three phases will be formed.

6. A method according to claim 1, wherein the organic acid is used to bond and remove heavy metals from the solution.

7. An apparatus for performing the method of claim 1, comprising an absorber, a heat exchanger, a desorber and a reboiler, wherein
    at least one supply of organic acid is provided before the desorber or before the cross flow heat exchanger,
    a separator/condenser is arranged in a recycle line between the heat exchanger and the absorber to separate the organic acid from the lean absorbent.

8. An apparatus according to claim 7, further comprising a desorber overhead separator for separating the three phases formed, and
    pipelines for recycling an organic acid rich phase and a phase rich in water and absorbent.

9. An apparatus according to claim 7, wherein the organic acid is supplied and mixed with the organic acid from the separator just before the rich absorbent cross flow heat exchanger inlet.

10. Apparatus according to claims 7, wherein a separator is placed between the heat exchanger and the desorber inlet to separate a second liquid phase comprising organic solvent with some organic acid to be returned to the lean absorbent before the heat exchanger.

11. Apparatus according to claim 7, wherein an acid wash device for removal of heavy metal from the organic phase is placed such that metal containing organic acid can be removed, washed and returned.

* * * * *